(12) United States Patent
Begeja et al.

(10) Patent No.: US 8,781,179 B2
(45) Date of Patent: *Jul. 15, 2014

(54) SYSTEM AND METHOD TO ASSIGN A DIGITAL IMAGE TO A FACE CLUSTER

(71) Applicant: AT&T Intellectual Property I, L.P., Atlanta, GA (US)

(72) Inventors: Lee Begeja, Gillette, NJ (US); Zhu Liu, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,790

(22) Filed: Oct. 29, 2012

(65) Prior Publication Data

US 2013/0070975 A1    Mar. 21, 2013

Related U.S. Application Data

(63) Continuation of application No. 12/629,215, filed on Dec. 2, 2009, now Pat. No. 8,351,661.

(51) Int. Cl.
*G06K 9/36* (2006.01)
*G06K 9/62* (2006.01)

(52) U.S. Cl.
USPC .......................................... 382/118; 382/225

(58) Field of Classification Search
None
See application file for complete search history.

(56) References Cited

U.S. PATENT DOCUMENTS

| | | |
|---|---|---|
| 7,920,745 B2 | 4/2011 | Song et al. |
| 2002/0136448 A1 | 9/2002 | Bortolussi et al. |
| 2002/0146168 A1 | 10/2002 | Lee et al. |
| 2006/0210157 A1 | 9/2006 | Agnihotri et al. |
| 2007/0230799 A1 | 10/2007 | Shniberg et al. |
| 2008/0089561 A1 | 4/2008 | Zhang |
| 2008/0112621 A1 | 5/2008 | Gallagher et al. |
| 2008/0240237 A1 | 10/2008 | Tian et al. |
| 2008/0298766 A1 | 12/2008 | Wen et al. |
| 2008/0304755 A1 | 12/2008 | Xaio et al. |
| 2009/0169065 A1 | 7/2009 | Wang et al. |
| 2010/0066822 A1 | 3/2010 | Steinberg et al. |
| 2010/0070523 A1 | 3/2010 | Delgo et al. |

(Continued)

OTHER PUBLICATIONS

Deva Ramanan and Simon Baker (Toyota Technological Institute at Chicago, Chicago, IL) and Sham Kakade (Microsoft Research, Redmond, WA); "Leveraging Archival Video for Building Face Datasets"; http://www.ics.uci.edu/-dramanan/papers/faces.pdf; ICCV, Oct. 2007; 8 pages.

(Continued)

*Primary Examiner* — Brian P Werner
(74) *Attorney, Agent, or Firm* — Tolar Law Group, PC

(57) ABSTRACT

A method includes accessing a digital image including a plurality of faces including a first face and a second face. The method includes identifying a plurality of identification regions of the digital image including a first identification region associated with the first face and a second identification region associated with the second face. The method also includes assigning the digital image to a first face cluster of a plurality of face clusters when a difference between data descriptive of the first identification region and data descriptive of a face cluster identification region of the first face cluster satisfies a threshold. The method further includes assigning the digital image to a second face cluster of the plurality of face clusters based at least partially on a frequency of the second face and the first face appearing together in an image.

20 Claims, 9 Drawing Sheets

(56) References Cited

U.S. PATENT DOCUMENTS

| | | | |
|---|---|---|---|
| 2010/0226584 A1 | 9/2010 | Weng et al. | |
| 2010/0310134 A1 | 12/2010 | Kapoor et al. | |
| 2011/0013810 A1* | 1/2011 | Engstrom et al. | 382/118 |
| 2013/0050460 A1* | 2/2013 | Steinberg et al. | 348/77 |

OTHER PUBLICATIONS

Yuandong Tian (Shanghai Jiaotong University, China), Wei Liu (The Chinese University of Hong Kong), Rang Xiao, Fang Wen and Xiaoou Tang (Microsoft Research Asia, Beijing, China); A Face Annotation Framework with Partial Clustering and Interactive Labeling:; Computer Vision and Pattern Recognition 2007 CVPR IEEE Jun. 17-22, 2007; 8 pages.

Lee Begeja (AT&T Labs—Research, Florham Park, NJ) and Zhu Liu (AT&T Labs—Research, Middletown, NJ); "Searching and Browsing Video in Face Space"; 2009 11th IEEE International Symposium on Multimedia San Diego, CA, Dec. 14-16, 2009; 8 pages.

Bongwon Suh & Benjamin B. Bederson; "Semi-Automatic Image Annotation Using Event and Torso Identification"; Department of Computer Science, Human-Computer Interaction Laboratory, University of Maryland College Park, MD; 2004; http://hcil.cs.umd.edu/trs/2004-15/2004-15.html; 4 pages.

Non-Final Rejection for U.S. Appl. No. 12/692,215 received from United States Patent and Trademark Office (USPTO) mailed May 25, 2012, 8 pages.

Notice of Allowance for U.S. Appl. No. 12/692,215 received from United States Patent and Trademark Office (USPTO) mailed Sep. 17, 2012, 13 pages.

* cited by examiner

SYSTEM AND METHOD TO ASSIGN A DIGITAL IMAGE TO A FACE CLUSTER

CLAIM OF PRIORITY

This application is a Continuation Patent Application of, and claims priority from, U.S. patent application Ser. No. 12/629,215, filed on Dec. 2, 2009, and entitled "SYSTEM AND METHOD TO ASSIGN A DIGITAL IMAGE TO A FACE CLUSTER," which is hereby incorporated by reference in its entirety.

FIELD OF THE DISCLOSURE

The present disclosure is generally related to assigning a digital image to a face cluster.

BACKGROUND

Video content may be analyzed to identify semantic information that can be used to generate metadata associated with the video content. One way of generating metadata for indexing video content uses language analysis. Many tools that use language analysis are based on analyzing the English language and may not be useful when analyzing video content produced in languages other than English. In addition, the video content may include semantic information that may not be easily extracted using language analysis.

Analyzing video content using image analysis may be useful to extract semantic information from the video content that is difficult to extract using language analysis. When analyzing video content using image analysis, portions of the images may not be identifiable. For example, when a person in an image has her head turned to display a side profile of her face, the image may not contain sufficient information to enable an image analyzer to recognize the person in the image.

DETAILED DESCRIPTION

Figure 1:
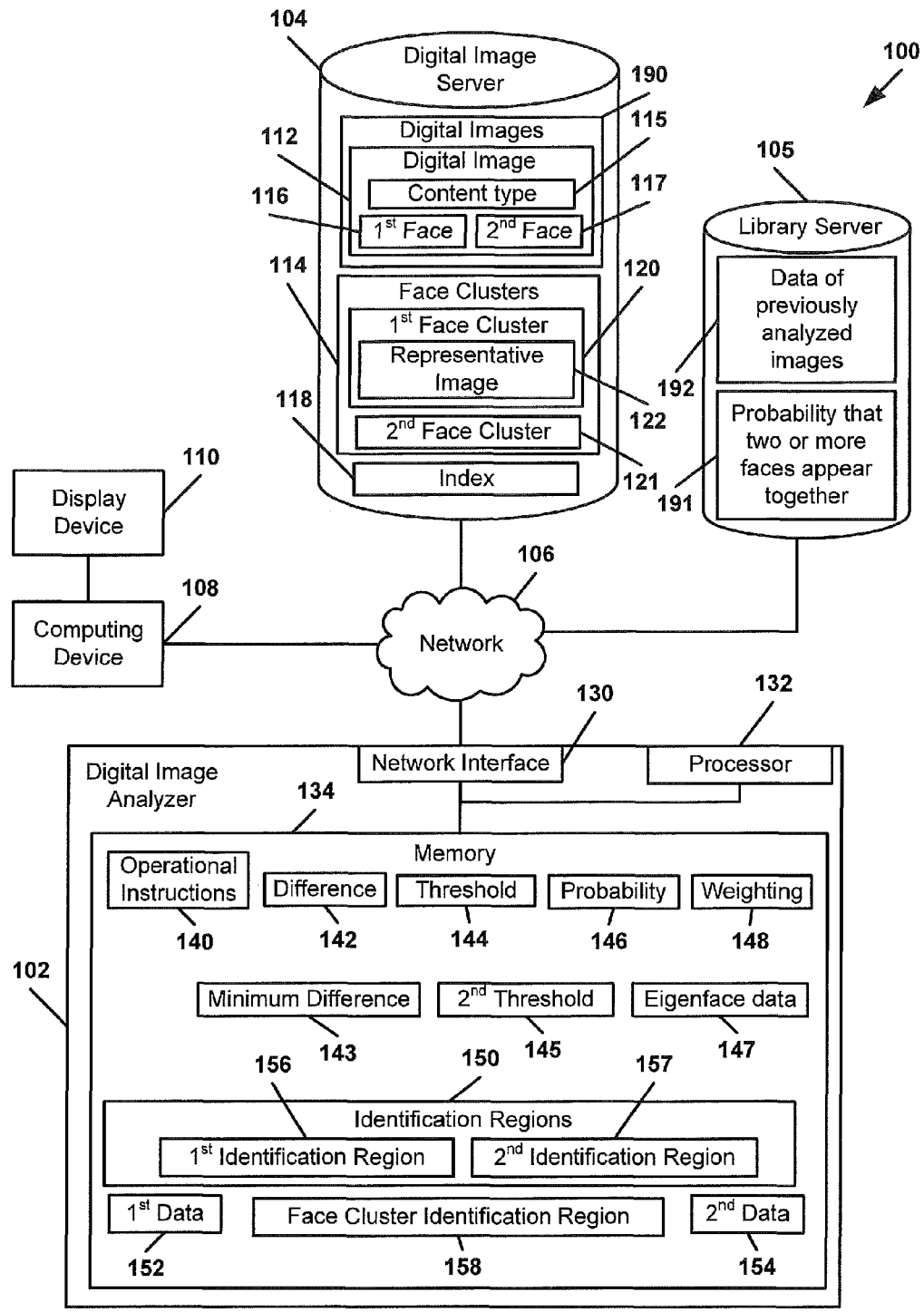
FIG. 1 depicts a first particular embodiment of a system to assign a digital image to a face cluster.

A digital video may include a sequence of shots that correspond to a view captured by an individual camera. The shots may be compiled together directly (e.g., cut) or compiled together using a visual effect, such as a fade in/fade out or a dissolve. Each shot may be separated into individual digital images. At least some of the digital images may include multiple faces (e.g., a first face and a second face). Each digital image may be analyzed and placed in a particular face cluster among multiple face clusters. When clustering, the digital images may be analyzed to identify faces in the digital images using identification regions. For example, a first identification region of the digital image may be determined for the first face and a second identification region of the digital image may be determined for the second face. A particular digital image may be assigned to a first face cluster when a difference between the first identification region and images in the first face cluster is less than a particular threshold.

When all the digital images of the shot have been analyzed, selected face clusters may be merged based on similarities between the faces in the digital images. For example, when two digital images from two different face clusters each have a different pose of the same person, a comparison of the two digital images may determine that the two different poses are of the same person. As a result of the determination, the two different face clusters may be merged into one face cluster, placing the two different poses of the same person into one face cluster. When all the multiple clusters have been merged, each cluster may include different images of the same person. For example, each of the digital images of a first cluster may include a first face and each of the digital images of a second cluster may include a second face.

In some digital images, at least one of the faces may not be identifiable. For example, the head of the person may be obscured by another object or turned at an angle that does not present sufficient information to enable a comparison of the face of the person to other digital images. In some digital photos, when a digital image has at least two faces and at least one face is identifiable while a second face is not identifiable, the digital image may be assigned to a second face cluster based at least partially on a probability of the second face and the first face appearing together in an image. For example, when the first face is identifiable but another face is not identifiable (e.g., is unknown), the computer implemented method may determine that the first face and the second face appear together in a certain percentage (e.g., ninety percent) of the digital images in the shot and may identify the unknown face as the second face based on the probability (e.g., ninety percent) that the second face and the first face appear together in a particular digital image. When clustering is complete and some faces are unidentified, the digital images of the video may be analyzed to identify which faces appear together and to determine a probability that when a first face appears in a particular digital image, a second face also is likely to appear in the particular digital image. Using this information, a face that is not identifiable using clustering may be identifiable by determining a probability that two or more faces would likely appear together in the digital images. For example, in a wedding video, ninety percent of the digital images in a particular shot may include the face of the bride and the face of the groom. When the groom kisses the bride, the face of the bride may be obscured by the groom and may not present sufficient information to enable her face to be compared to other faces during clustering. When the groom kisses the bride and the face of the groom is identified, there is a ninety percent probability that a digital image that includes the groom also includes the bride, enabling the obscured face to be identified as that of the bride.

Analyzing each shot or each video to determine a probability that when a first face is present in a digital image a second face is also present in the digital image may be time consuming. One way to reduce the time needed to analyze a particular video is to analyze many videos ahead of time and build up a library (e.g., database) of faces and a probability that a first face and a second face appear together in a particular digital image. For example, multiple videos of a television show or movie series may be analyzed to identify probabilities associated with the first face and the second face appearing together in a particular digital image. For example, previous episodes of a television program may be analyzed to identify which faces appear together and the probability that they appear together and the results are stored in a database. When a new episode is released, a video index of the new episode may be created using clustering. The database that includes the results of analyzing the previous episodes may be used to assist in identifying any faces that are not identifiable using clustering.

In a particular embodiment, a computer implemented method includes accessing a digital image. The digital image includes a plurality of faces. The plurality of faces include a first face and a second face. The computer implemented method identifies a plurality of identification regions of the digital image including a first identification region associated with the first face and a second identification region associated with the second face. The computer implemented method assigns the digital image to a first face cluster when a difference between data descriptive of the first identification region and data descriptive of a face cluster identification region of the first face cluster satisfies a threshold. The computer implemented method assigns the digital image to a second face cluster based at least partially on a probability of the second face and the first face appearing together in an image.

In another particular embodiment, a system includes at least one processor and at least one memory accessible to the at least one processor. The at least one memory includes processor-executable instructions that, when executed by the at least one processor, cause the at least one processor to access a digital image including a plurality of faces including a first face and a second face. The at least one memory includes processor-executable instructions that, when further executed by the at least one processor, cause the at least one processor to identify a plurality of identification regions of the digital image including a first identification region associated with the first face and a second identification region associated with the second face. The at least one memory includes processor-executable instructions that, when further executed by the at least one processor, cause the at least one processor to assign the digital images to a first face cluster of a plurality of face clusters when a difference between data descriptive of the first identification region and data descriptive of a face cluster identification region of the first face cluster satisfies a threshold. The at least one memory includes processor-executable instructions that, when further executed by the at least one processor, cause the at least one processor to assign the digital image to a second face cluster of the plurality of face clusters based at least partially on a probability of the second face and the first face appearing together in an image.

Referring to FIG. 1, a block diagram of a first particular embodiment of a system to assign a digital image to a face cluster is depicted and generally designated 100. The system 100 includes a digital image analyzer 102 coupled to a digital image server 104 and a library server 105 via a network 106, such as a computer network. A computing device 108 is coupled to the network 106. A display device 110 is coupled to the computing device 108.

The digital image server 104 may include digital image data, such as digital images 190. The digital images 190 may include frames of video data. The digital image server 104 may also include face clusters 114 and an index 118. A particular digital image 112 of the digital images 190 may include at least a first face 116 and a second face 117. For example, the first face 116 may be the face of a first actor and the second face 117 may be the face of a second actor. The face clusters 114 include at least a first face cluster 120 and a second face cluster 121. Each of the face clusters 102-121 may include images that the digital image analyzer 102 has analyzed and determined to be associated with the same person.

The library server 105 may store a probability that two faces appear together 191 and data about previously analyzed images 192. The digital image analyzer 102 may analyze videos (e.g., movies, television programs, and advertisements) and store the results, including the probability that two faces appear together 191 and the data about previously analyzed images 192, at the library server 105. For example, the digital image analyzer 102 may analyze movies in a particular series, such as Superhero, Return of the Superhero, and Superhero's Revenge, and store the results of the analysis at the library server 105. When a new movie Superhero and the Evil Genius is released, the digital image analyzer 102 may use the probability that two faces appear together 191 and the data about previously analyzed images 192 when analyzing the new movie. To illustrate, by analyzing the previous movies, the digital image analyzer 102 may identify a face of the superhero and a face of a sidekick of the superhero and store the probability that the face of the superhero and the face of the sidekick appear together in a digital image as the probability that two or more faces appear together 191. When the digital image analyzer 102 analyzes the new movie to identify a first face as the superhero and the second face is not identifiable, the digital image analyzer 102 may use the probability that two or more faces appear together 191 to identify the second face as that of the sidekick.

The computing device 108 may be a desktop computer, a laptop computer, a set-top box device, a personal digital assistant, a wireless communications device, another type of computing device, or any combination thereof. A user may use the computing device 108 to send a request to the digital image analyzer 102 to analyze the digital images 190 to create the index 118. The index 118 may be used by one or more users to search and browse the digital images 190. The computing device 108 may be used to search or browse the digital images 190. The results of the search or the browsing may be displayed at the display device 110. For example, the computing device 108 may be used to generate a search to find all the different outfits a particular actor has worn in a particular movie based on the digital images 190.

The digital image analyzer 102 may be used to analyze the digital images 190 and to create the face clusters 114 associated with the digital images 190. The digital image analyzer 102 may analyze the face clusters 114 to generate the index 118 associated with the digital images 190. The digital image analyzer 102 includes a network interface 130, at least one processor 132, and a memory 134. The memory 134 includes operational instructions 140 that are executable by the at least one processor 132 to perform various functions of the digital image analyzer 102.

In operation, the digital image analyzer 102 may access the digital image 112 that includes the faces 116-117. The digital image analyzer 102 may identify identification regions of the digital image 112, such as a first identification region 156 associated with the first face 116 and a second identification region 157 associated with the second face 117. An identification region may be a region that includes a portion of the digital image 112 for use in identifying a face, such as the first face 116 or the second face 117. For example, each of the identification regions 156,157 may include a face of a person, the face and the torso of a person, the eyebrows, nose, and mouth of a person, another portion of the digital image 112, or any combination thereof. The digital image analyzer 102 may identify the identification regions 156-157 of the digital image 112 by searching for the faces 116-117 in the digital image 112.

The digital image analyzer 102 may assign the digital image 112 to the first face cluster 120 when a difference between first data 152 descriptive of the first identification region 156 and second data 154 descriptive of a face cluster identification region 158 of the first face cluster 120 satisfies a threshold 144. For example, the first data 152 may be an eigenface value that is compared to eigenface values of faces in a cluster (e.g., second data 154). When the difference between the first data 152 and the second data 154 is less than the threshold 144, the faces corresponding to the first data 152 and the second data 154 may be considered to be the same face and the digital image 112 is assigned to the first face cluster 102 that it was being compared to. The threshold 144 may be user adjustable. The threshold 144 may be selected by the digital image analyzer 102 based on the content type 115. For example, the digital image analyzer 102 may select a particular value for the threshold 144 when the content type 115 identifies the digital image 112 as having an action movie content type and may select another particular value for the threshold 144 when the content type 115 identifies the digital image 112 as having a television talk show content type.

The digital image analyzer 102 may assign the digital image 112 to the second face cluster 121 based at least partially on a probability 146 of the second face 117 and the first face 116 appearing together in the digital image 112. For example, the faces 116-117 may be of two people that often appear together in digital images, such as an actor and actress in a movie that are portraying a husband and wife. The digital image analyzer 102 may determine a frequency at which the two people (e.g. the faces 116-117) appear together in a digital image (e.g., ninety percent of the time). In a particular embodiment, the frequency with which two faces, such as the first face 116 and the second face 117, appear together may be determined by analyzing a portion of video data (e.g., a television program, a movie, or an advertisement). To illustrate, a particular shot, a series of shots, or the entire media content file may be analyzed to identify the frequency with which the first face 116 and the second face 117 appear together in a particular digital image. The analysis may include identifying a subset of the digital images 190 in which the first face 116 and the second face 117 appear together. In another particular embodiment, the probability that two faces appear together 191 and the data about previously analyzed images 192 may be used to determine the frequency with which two faces, such as the first face 116 and the second face 117, appear together. Thus, when the first face 116 is identified as associated with one of the two people and is placed in the first face cluster 120, the digital image analyzer 102 may assign the digital image 112 to the second face cluster 121 based on the probability 146 that the faces 116-117 would appear together in the digital image 112.

After assigning the digital image 112 to the first face cluster 120, the digital image analyzer 102 may analyze images assigned to the first face cluster 120 and select a particular digital image of the first face cluster 120 as a representative image 122 of the first face cluster 120. For example, after assigning many digital images of an actor to the first face cluster 120, the digital image analyzer 102 may select a particular digital image of the actor from the first face cluster 120 as the representative image 122. The representative image 122 may be used in the index 118 to identify the actor associated with the images in the first face cluster 120. For example, a graphical user interface (e.g., see FIGS. 4-5) that includes the index 118 may be presented to the computing device 108 to enable a user to browse a video associated with the digital images 190. The index 118 may display a representative image of each person identified in the digital images 190.

The digital image analyzer 102 may analyze the images assigned to the first face cluster 120 by determining a difference 142 between each digital image of the first face cluster 120 and each of the other digital images of the first face cluster 120. For example, an eigenface value may be determined for each digital image of the first face cluster 120. The representative image 122 may have an average difference with respect to the other digital images that is smaller than an average difference value of the other digital images. To illustrate, the representative image 122 may be the image that has the most in common (e.g., smallest average difference) when compared to the other images in the cluster. Eigenface values of each of the digital images of the first face cluster 120 may be compared to select the representative image 122. For example, the representative image 122 may be chosen such that the representative image 122 has the least difference 142 between the representative image 122 and the other images in the first face cluster 120.

The digital image analyzer 102 may iteratively merge the face clusters 120-121 based on the difference 142 descriptive of differences between digital images assigned to each of the face clusters 120-121 until a minimum difference 143 between the face clusters 120-121 fails to satisfy a second threshold 145. For example, the digital analyzer 102 may perform an analysis of a particular media content item and initially assign each of the digital images 190 of the particular media content to its own face cluster. The digital image analyzer 102 may iteratively merge at least some of the face clusters, such as the face clusters 120-121, when the face clusters contain digital images of the same person until the minimum difference 143 between the face clusters 120-121 does not satisfy the second threshold 145. That is, the digital image analyzer 102 may use a hierarchical agglomerative clustering process to assign each face identified in the digital images 190 to the clusters 120-121. Thus, a digital image that includes several faces may be placed in several clusters.

The difference 142 that describes the difference between the first identification region 156 and the face cluster identification region 158 may be a maximum difference value between the first identification region 156 and each identification region associated with the first face cluster 120. That is, the first identification region 156 may be compared to identification regions of each digital image assigned to a particular cluster to determine which identification region associated with the cluster is least like the first identification region 156 (e.g., has a largest difference in eigenface value). The difference 142 may be the difference between the identification region 156 and the identification region associated with the cluster that is least like (i.e., most unlike) the first identification region 156.

The digital image analyzer 102 may determine eigenface data 147 for the first identification region 156. The difference 142 may be based on the eigenface data 147. That is, the difference 142 may be determined by a mathematical comparison of eigenface data 147 for two identification regions. The digital image analyzer 102 may determine the difference 142 using a method that depends at least partially on a content type 115 of a source of the digital image 112. For example, the digital image analyzer 102 may select a first method when the content type 115 identifies that the digital image 112 is from a movie and select a second method when the content type 115 identifies that the digital image 112 is from a television program.

In a particular embodiment, the digital image analyzer 102 may assign the digital image 112 to the first face cluster 120 by applying a weighting 148 to data descriptive of the two or more identification regions 156-157 associated with the first face 116. The digital image analyzer 102 may determine the difference 142 between the weighted data descriptive of the two or more identification regions 156-157 associated with the first face 116 and data descriptive of the face cluster identification region 158.

Thus, the digital image analyzer 102 may identify digital images 190, such as the digital image 112, of digital media content, such as video content. The digital image analyzer 102 may identify faces, such as the faces 116-117, in the digital images 190 and assign each of the faces 116-117 to one of the face clusters 120-121. By iteratively merging two or more of the face clusters 120-121 when the differences between the image/images in each cluster are less than the threshold 144, the digital image analyzer 102 may place images of each face in its own, individual cluster. The digital image analyzer 102 may also assign certain of the digital images to a face cluster based on a probability of two faces appearing together in a digital image. The digital image analyzer 102 may create the index 118 to enable a user to search the digital media content and identify scenes that include a particular face.

Figure 2:
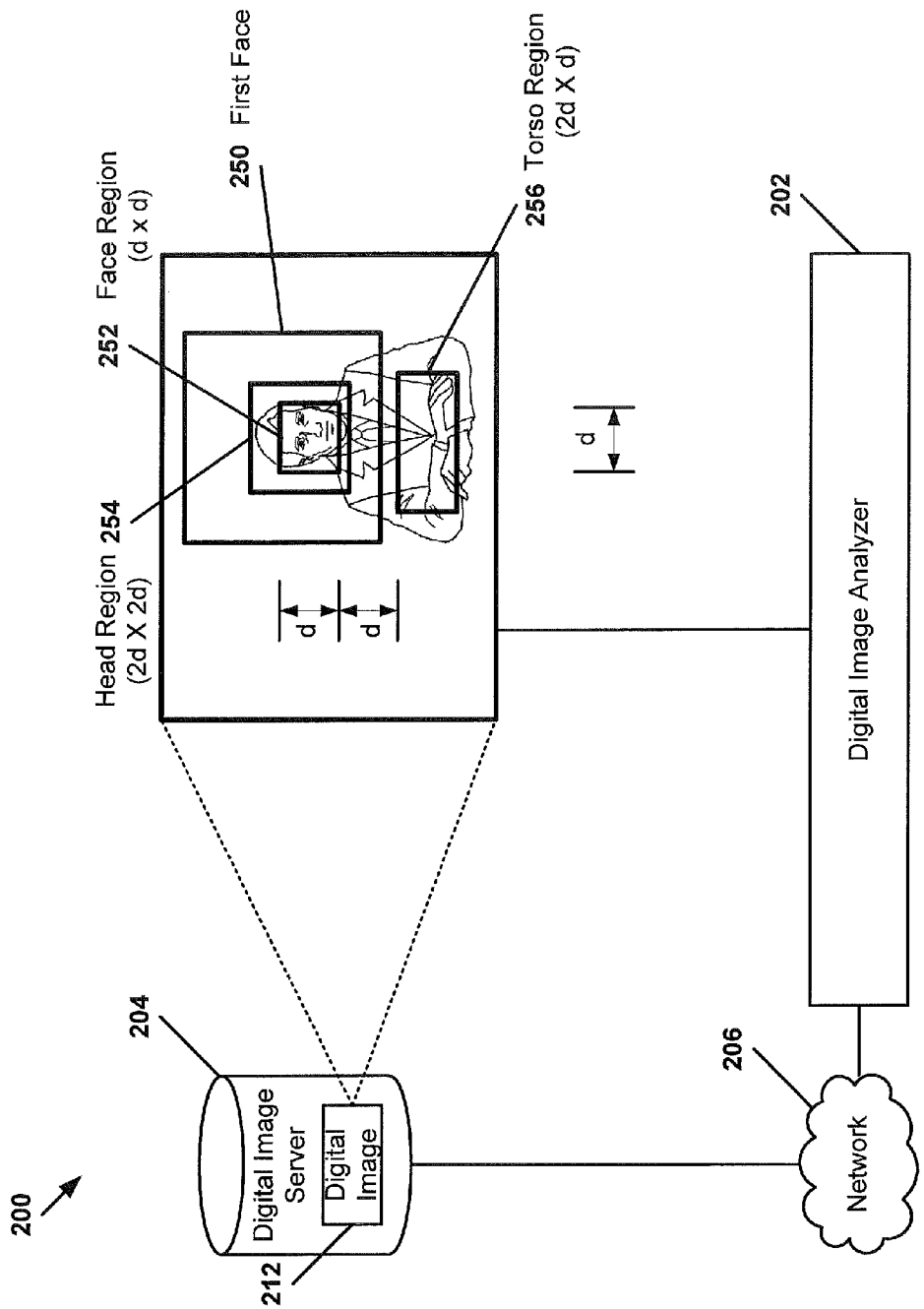
FIG. 2 depicts a second particular embodiment of a system to assign a digital image to a face cluster.

Referring to FIG. 2, a block diagram of a second particular embodiment of a system to assign a digital image to a face cluster is depicted and generally designated 200. The system 200 includes a digital image analyzer 202 coupled to a digital image server 204 via a network 206. The digital image server 204 includes a digital image 212.

The digital image analyzer 202 may identify identification regions of the digital image 212 by searching for faces in the digital image 212. When the digital image analyzer 202 detects a first face 250, the digital image analyzer 202 may select a portion of the digital image 212 as a face region 252 (e.g., a first identification region) based on characteristics of the first face 250. For example, the face region 252 may include the eyebrows, eyes, noses, and mouth of the face. The digital image analyzer 202 may determine a data set descriptive of the first face 250 based at least partially on the face region 252. For example, the digital image analyzer 202 may determine an eigenface value of the first face 250 based on the face region 252.

The digital image analyzer 202 may select a second portion of the digital image 212 as a head region 254 (e.g., a second identification region). The head region 254 may be larger than the face region 252. The head region 254 and the face region 252 may both have a center at approximately the same location of the digital image 212. The face region 252 may have a first characteristic length based on the characteristics of the first face 250, such as a distance between eyebrows and a mouth of the first face 250. The head region 254 may have a second characteristic length that is a predetermined multiple of the first characteristic length.

The digital image analyzer 202 may select a third portion of the digital image 212 as a torso region 256 (e.g. a third identification region). The torso region 256 may not include the face region 252 or the head region 254. The torso region 256 may have a third characteristic length that is a predetermined multiple of the first characteristic length of the face region 252. The third characteristic length of the torso region 256 may specify dimensions of the torso region 256 and an offset of the torso region from the face region 252 or from the head region 254.

The head region 254 and the torso region 256 may be detected based on a location and a size of faces detected in the digital image 212. The digital image analyzer 202 may be calibrated to use a particular geometric relationship among the face region 252, the head region 254, and the torso region 256. In FIG. 2, the face region 252 is depicted as a square that covers the majority portion of a face from eyebrow to chin and has a length d and a width d. Based on the face region 252, the head region 254 may be a square with a length of 2d and a width of 2d. The torso region 256 may be a rectangle that is offset below the face region 252 by a length d and that has dimensions of a length 2d and width d. Thus, the torso region 256 may include a portion of an article of clothing associated with the first face 250 in an expected orientation (that is, when a torso associated with the first face 250 is below the first face 250).

The digital image analyzer 202 may cluster detected faces using information descriptive of the face region 253, the head region 254, the torso region 256, another region of the digital image 212, or any combination thereof. For example, the digital image analyzer 202 may determine eigenface values or other numerical representations of the regions 253, 254, 256 to enable numerical comparison of the regions 253, 254, 256 with regions from other digital images. To illustrate, information descriptive of the torso region 256 may be used to identify patterns of clothing in the torso region 256 in order to differentiate among different people in various digital images based on the probability that a particular person may wear the same clothing throughout a particular video sequence (e.g., shot).

The digital image analyzer 204 may extract features from the face region 252, the head region 254, and the torso region 256 to measure the dissimilarity among faces. For example, the digital image analyzer 202 may determine color moments in LUV color space (9 features). The digital image analyzer 202 may determine Gabor texture (mean and standard deviation) in a combination of three scales in four directions (24 features) and determine an edge direction histogram in sixteen bins (17 features including one bin for non-edge pixels). The digital image analyzer 202 may use these fifty dimensional low level features to represent the color and picture patterns of the torso region 256 and the head region 254 in the digital image 212.

To illustrate, for a given face region i, head and torso features may be denoted by $H_i, T_i$, respectively. A dissimilarity (e.g., distance) between two head regions of the faces $F_i$ and $F_j$, HD (i,j), may be determined based on $SQRT(\|I_i-I_j\|)^2$. A dissimilarity between two torso regions, TD(i,j) may be determined based on $SQRT(\|T_i-T_j\|)^2$.

To determine a dissimilarity between face regions, an average face may denoted by $\psi$ and M eigenfaces by $u_n$, where $n=1, \ldots M$. For a given face region $F_i$, the digital image analyzer 202 may compute the eigenface components $\Omega_i = (\omega^i_n, n=1, \ldots M)$ by $\omega^i_n = u^T_n (F_i - \psi)$. The average face and the eigenfaces may be adaptively trained based on all faces detected in a particular video program or all faces detected in a library of video programs. For example, detected faces may be resized to 50×50 and the number of eigenfaces M may be preset to sixteen. A distance FD(i,j) between two face regions Fi and Fj may be determined based on $SQRT(\|\Omega_i-\Omega_j\|)^2$.

Based on visual features extracted from each face, the digital image analyzer 202 may determine a dissimilarity between two or more faces to cluster faces using the face region 252, the head region 254, the torso region 256, another region, or any combination thereof. For example, the digital image analyzer 202 may determine a dissimilarity between two or more faces using the head region 254 alone, the torso region 256 alone, the face region 252 alone, the head region 254 and the torso region 256 together, the face region 252 and the torso region 256, together, or any other combination. When using two or more regions together, such as the head region 254 and the torso region 256, a facial dissimilarity may be determined based on a weighted summation of the dissimilaries of the two or more regions, e.g., a weighted sum of torso region 256 dissimilarities and of head region 254 dissimilarities. For example, the weight summation may be calculated as: $\alpha \cdot TD + (1-\alpha) \cdot HD$, where $\alpha$ is a weighting factor, TD is a torso dissimilarity value and HD is a head region dissimilarity value. When using the torso region 256 and the face region 252, a facial dissimilarity may be determined based on eigenface projection. For example, the facial dissimilarity may be calculated as: $MIN(TD, FD)$, where MIN is a minimum function, TD is the torso region dissimilarity value and FD is a face region dissimilarity value.

Different methods of face clustering can be used in different applications. For example, the head region 254 may be used alone to group faces with different poses. The torso 256 and the face region 252 may be used together when merging faces with different poses together into a cluster.

Thus, the digital image analyzer 202 may identify identification regions, such as the face region 252, the head region 254, and the torso region 256, of the digital image 212. The digital image analyzer 102 may compare identification regions of multiple digital images to identify which digital images include a particular face.

Figure 3:
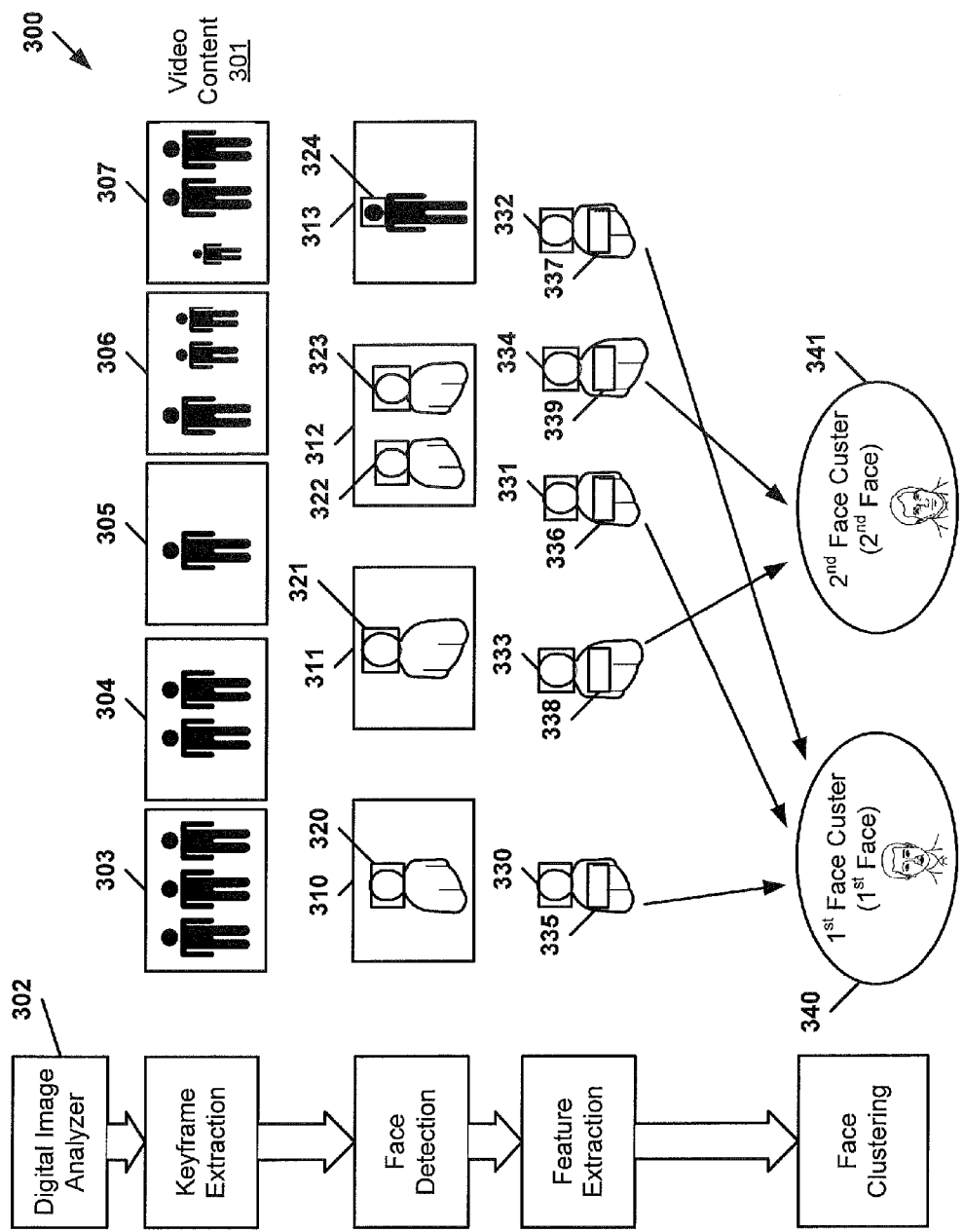
FIG. 3 depicts a third particular embodiment of a system to assign a digital image to a face cluster.

Referring to FIG. 3, a block diagram of a third particular embodiment of a system to assign a digital image to a face cluster is depicted and generally designated 300. FIG. 3 depicts how a digital image analyzer 302 may process digital images.

A digital video may be regarded as including a sequence of shots that correspond to individual camera actions. The shots may be compiled together directly (e.g., cut) or compiled together using visual effects (e.g., fade in, fade out, dissolve, etc.) The digital image analyzer 302 may perform Shot Boundary Detection (SBD) using multiple independent detectors (e.g., six independent detectors) to target the most common types of shot boundaries, e.g., cut, fade in, fade out, fast dissolve (e.g., less than five frames), dissolve (e.g., five or more frames), and motion. Each detector may be implemented using various programming techniques. For example, each detector may be implemented as a finite state machine (FSM) that has a different numbers of states to detect a particular transition pattern and locate the shot boundaries. The detectors may use a Support Vector Machines (SVM) based shot boundary verification method to verify the shot boundaries. The digital image analyzer 302 may fuse together the results of at least some of the detectors based on priorities of the detectors.

The shot boundary detectors may rely on two types of visual features, intra-frame features and inter-frame features. The intra-frame features may be extracted from a single, specific frame, and may include a color histogram, an edge, and other statistical features. The inter-frame features may use the current frame and one or more previous frames to capture motion compensated intensity matching errors and histogram changes. Two sets of inter-frame features may be used, one inter-frame feature between adjacent frames and the other inter-frame feature between two frames that are three frames away.

The digital image analyzer 302 may segment video content 301 into shots and may select a representative image (e.g., a keyframe), such as keyframes 303, 304, 305, 306, and 307, for each shot. The digital image analyzer 302 may detect one or more faces (e.g., face regions) in each keyframe. For example, the digital image analyzer 302 may identify a first face 320 in a first keyframe 310, a second face 321 in a second keyframe 311, a third face 322 and a fourth face 323 in third keyframe 312, and a fifth face 324 in a fourth keyframe 313. For each of the detected faces 320-324, the digital image analyzer 302 may extract visual features from both the faces 320-324 and the corresponding torsos 335-339. The digital image analyzer 302 may use the extracted visual features to determine similarities or dissimilarities among faces, such as a face 330, a face 331, and a face 332. For example, the digital image analyzer 302 may determine similarities among the faces 330-332 to assign the faces 330-332 to a first face cluster 340. The digital image analyzer 302 may determine similarities among the faces 333-334 and dissimilarities between the faces 330-332 and the faces 333-334 and assign the faces 333-334 to a second face cluster 340.

Clustering may be performed based on a head region (e.g., the head region 254 of FIG. 2), a face region (e.g. the face region 252 of FIG. 2), a torso region (e.g. the torso region 256 of FIG. 2), another region, or any combination thereof. For example, in some digital images, a face may not be in a frontal view or may be partially blocked, making it difficult to identify the face. For these digital images, another region, such as the torsos 335-339, may be used in addition to the faces 330-334, to provide additional information to identify each of the faces 330-334. The torsos 335-339 may provide complimentary information to the information provided by the faces 330-334. In another example, when a torso is not visible, the faces 330-332 may be clustered together based on their similarities. In still another example, when the faces 330-332 appear to be different due to different facial angles, the faces 330-332 may be clustered together based on similarities between the torsos 335-337 associated with the faces 330-332.

For each of the clusters 340-341, a face whose average distance (e.g., dissimilarity) from other faces within the same cluster is the smallest, may be chosen as a representative face. For example, the face 330 may be chosen as the representative face of the cluster 340 and the face 334 may be chosen as the representative face of the cluster 341. The average distance may also be known as a minimum average distance of a consistence of a cluster. The representative face may be used to create a face-based video navigation interface. The digital image analyzer 302 may identify an outlier face of each of the clusters 340-341, whose distance from the average face is the maximum within the cluster. The maximum distance may be used to set a distance threshold for different genres of videos.

The clustering results may be saved in a file with an eXtended Markup Language (XML) format. An example of an XML file that includes clustering results is as follows:

```
<mmimg id="694" start="2331298"
    type="BeginNormalShot">
  <face id="0" x="143" y="54" w="54" h="54">
    <cluster type="1" centroid="1" consist="0.3397" />
    <icon x="116" y="27" w="108" h="108" />
    <box x="170" y="135" w="108" h="54" />
  </face>
</mmimg>
```

In this example, one face is detected in a keyframe with an image id of 694 that occurs at 2,331,298 milliseconds from the start of the video. A location and a size of a face element may be specified using x (e.g., horizontal), y (e.g., vertical), w (e.g., width), and h (e.g., height). The detected face is assigned to cluster 1 and is the representative face (e.g., centroid=1) of the cluster. Additional information may also be included in the XML file. For example, the XML file may include data associated with regions, such a face region, a head region, a torso region, or another region. The XML file may include information used to create a user interface and a searchable index of digital images (e.g., the index 118 of FIG. 1).

Thus, the digital image analyzer 302 may detect shot boundaries, identify the shots of a video 303-307, and select a representative image of each shot as a keyframe, such as the keyframes 310-313. The digital image analyzer 302 may analyze each of the keyframes 310-313 to identify the faces 330-334. The digital image analyzer 302 may extract visual features of each of the faces 330-334 and determine similarities and dissimilarities among the faces 330-334. The digital image analyzer 302 may cluster the faces 330-334 into the clusters 336-337 based on the similarities and dissimilarities.

Figure 4:
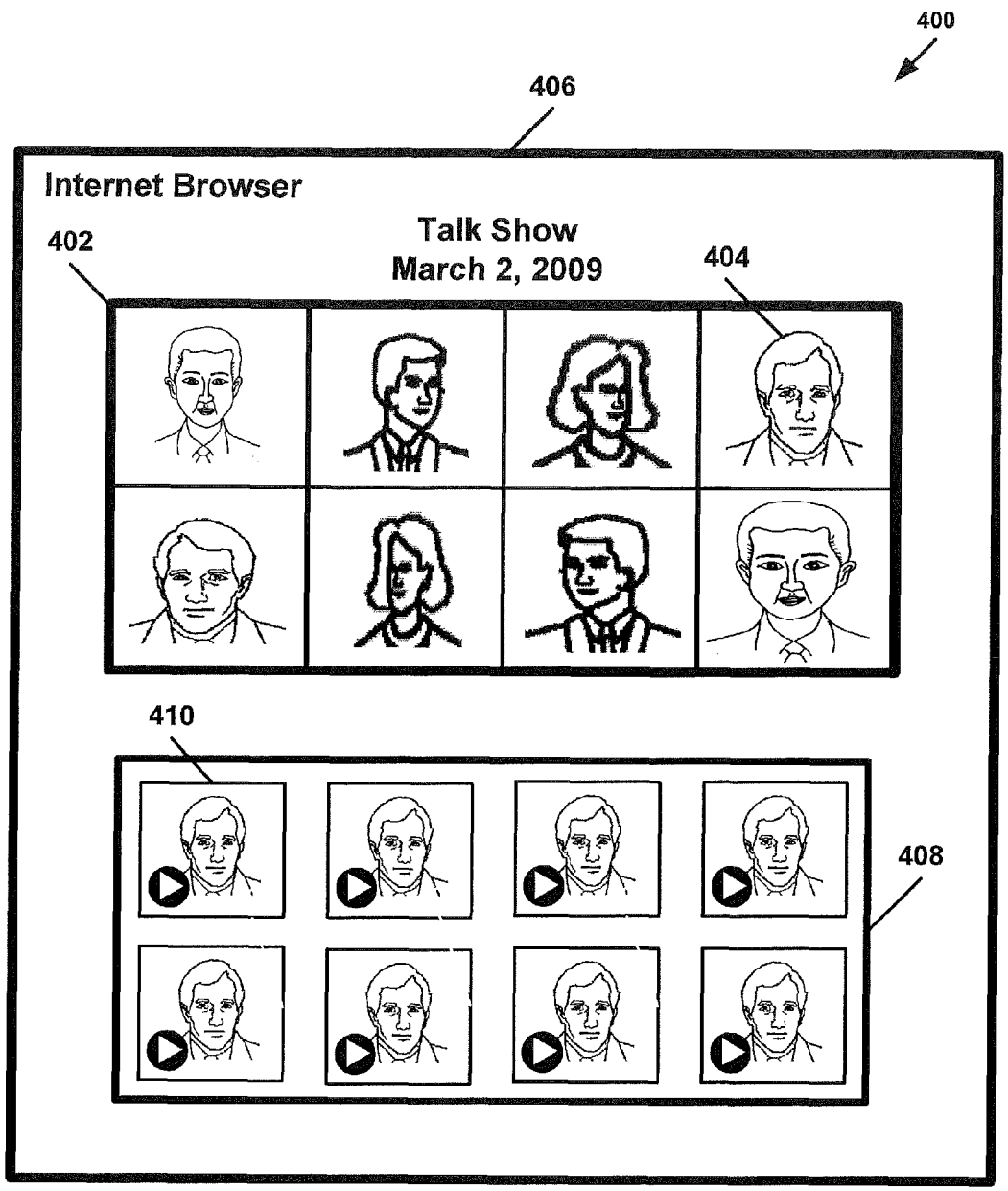
FIG. 4 depicts a first particular embodiment of a user interface to browse face clusters.

Referring to FIG. 4, a block diagram of a first particular embodiment of a user interface to browse face clusters is depicted and generally designated 400. The user interface 400 may display a set of representative images corresponding to a set of clusters 402 (e.g., an index of the digital video) at a first portion of a screen 406. The user interface 400 may display a representative image of each cluster as the set of clusters 402. The user interface 400 may enable a user to select a face 404 of the clusters 402 to have scenes 408 associated with the face 404 displayed at a second portion of the screen 406. Selecting a particular face 410 of the scenes 408 may cause a video associated with the face 410 to be played back, as displayed in FIG. 5. The video associated with the face 410 may be displayed for playback at the second portion of the screen 404 instead of or on top of the scenes 408.

Figure 5:
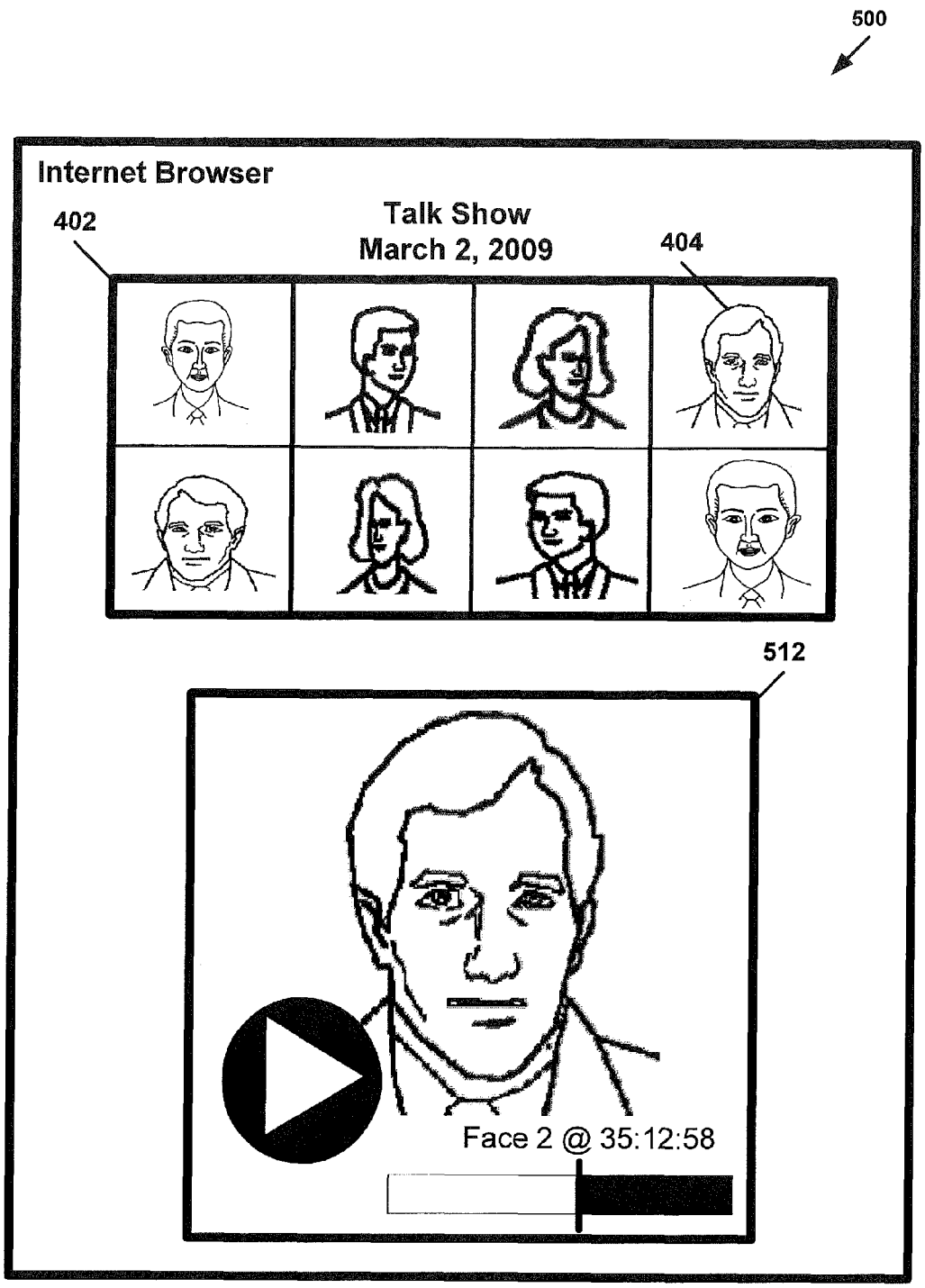
FIG. 5 depicts a second particular embodiment of a user interface to browse face clusters.

Referring to FIG. 5, a block diagram of a second particular embodiment of a user interface to browse face clusters is depicted and generally designated 500. When a user selects the face 404 of the cluster 402 via the user interface 400 of FIG. 4, the user interface 500 of FIG. 5 may be displayed to show a video 512 associated with the face 410. The user may select to playback the video 512.

Figure 6:
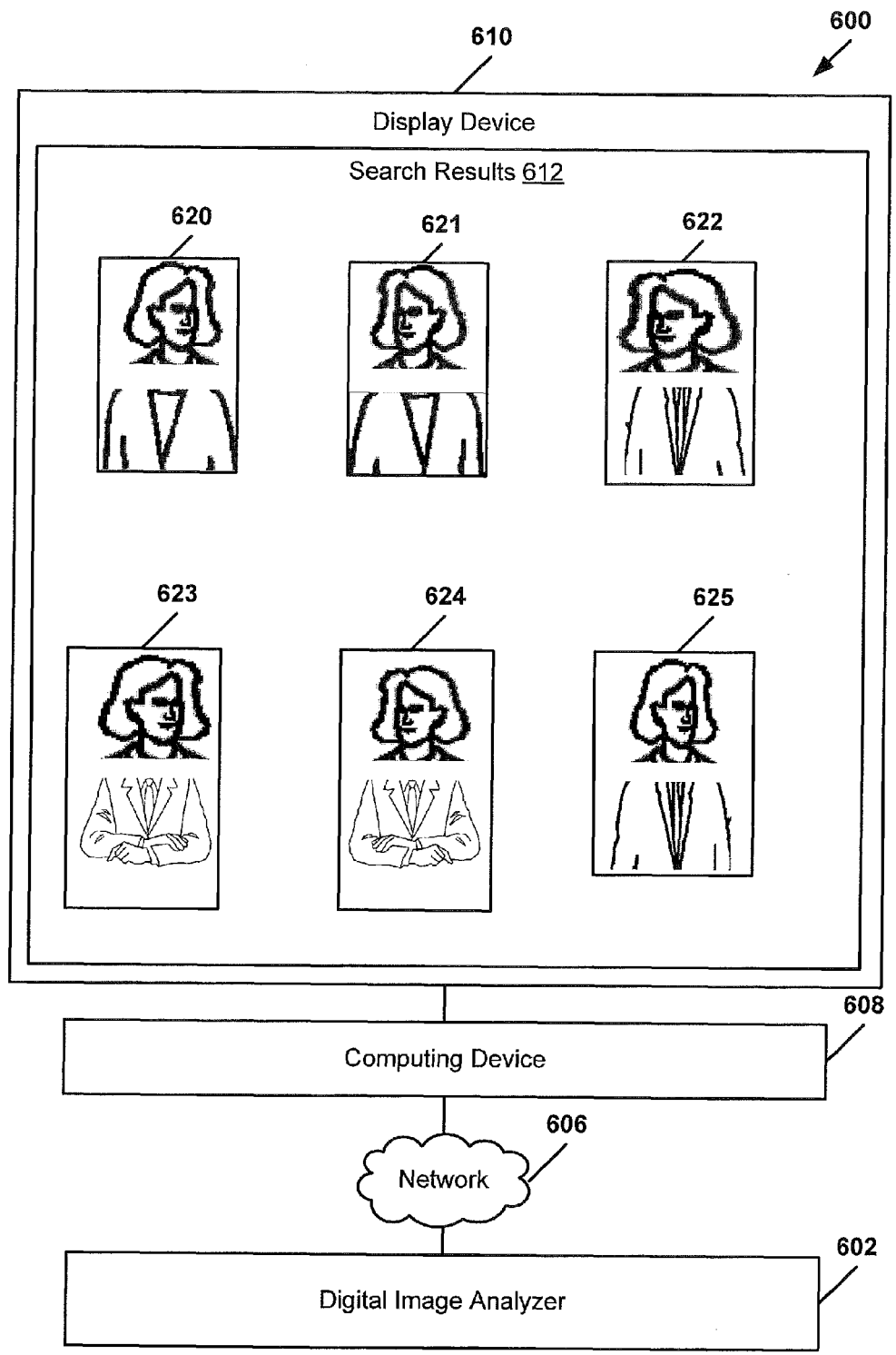
FIG. 6 depicts a fourth particular embodiment of a system to assign a digital image to a face cluster.

Referring to FIG. 6, a block diagram of a fourth particular embodiment of a system to assign a digital image to a face cluster is depicted and generally designated 600. The system 600 includes a digital image analyzer 602 and a computing device 608 coupled to a network 606. A display device 610 may be coupled to the computing device 608.

After a search of video content is initiated by a user, the computing device 608 may display the search results 612 at the display device 610. When a search includes instructions to give a torso region additional weight, the search results 612 may identify clusters, such as the clusters 620-625, showing a particular actress in different outfits worn in a movie.

Figure 7:
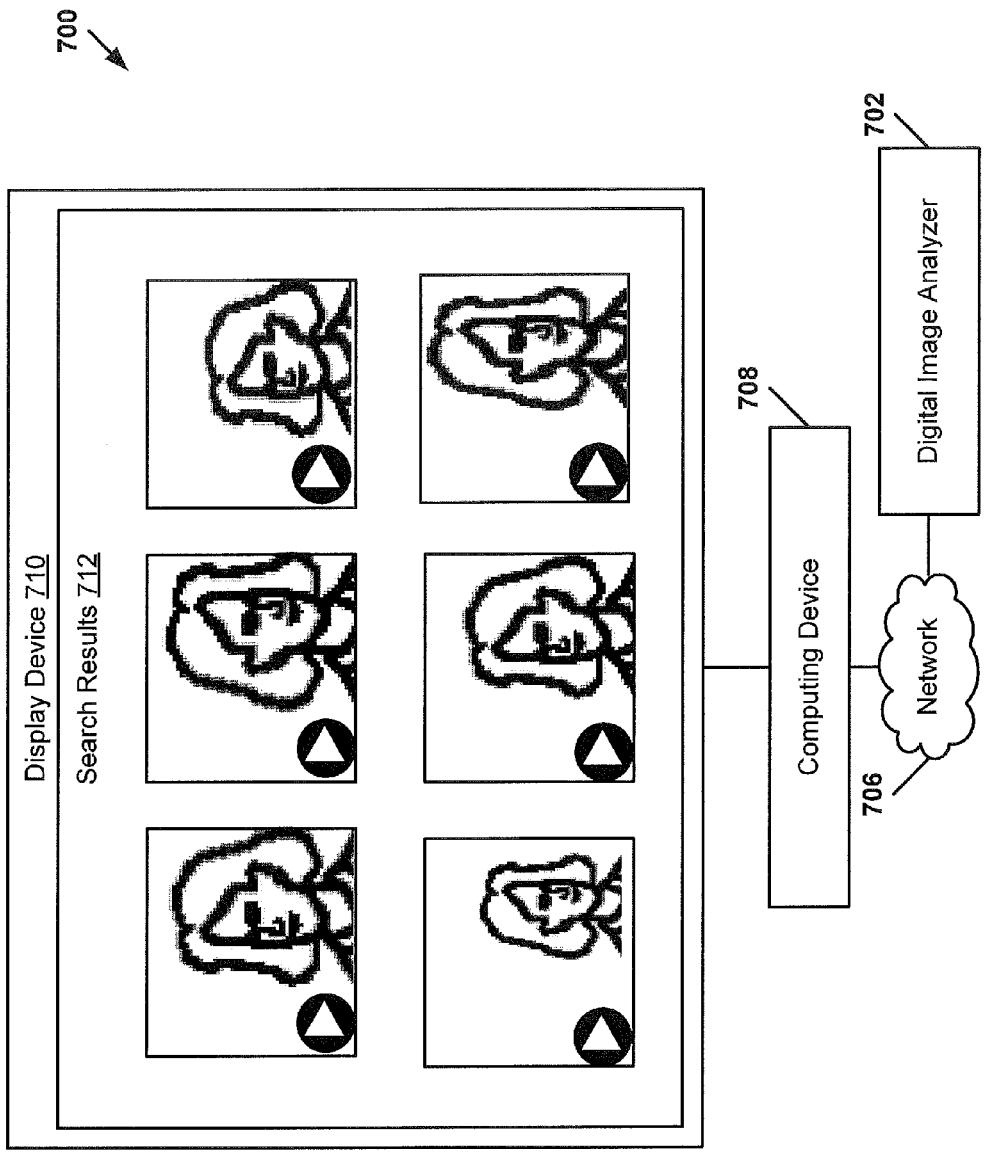
FIG. 7 depicts a fifth particular embodiment of a system to assign a digital image to a face cluster.

Referring to FIG. 7, a block diagram of a fifth particular embodiment of a system to assign a digital image to a face cluster is depicted and generally designated 700. The system 700 includes a digital image analyzer 702 and a computing device 708 coupled to a network 706. A display device 710 may be coupled to the computing device 708.

After a search of video content is initiated by a user, the computing device 708 may display search results 712 at the display device 710. The search results 712 may identify a single cluster having different poses of a particular actress.

Figure 8:
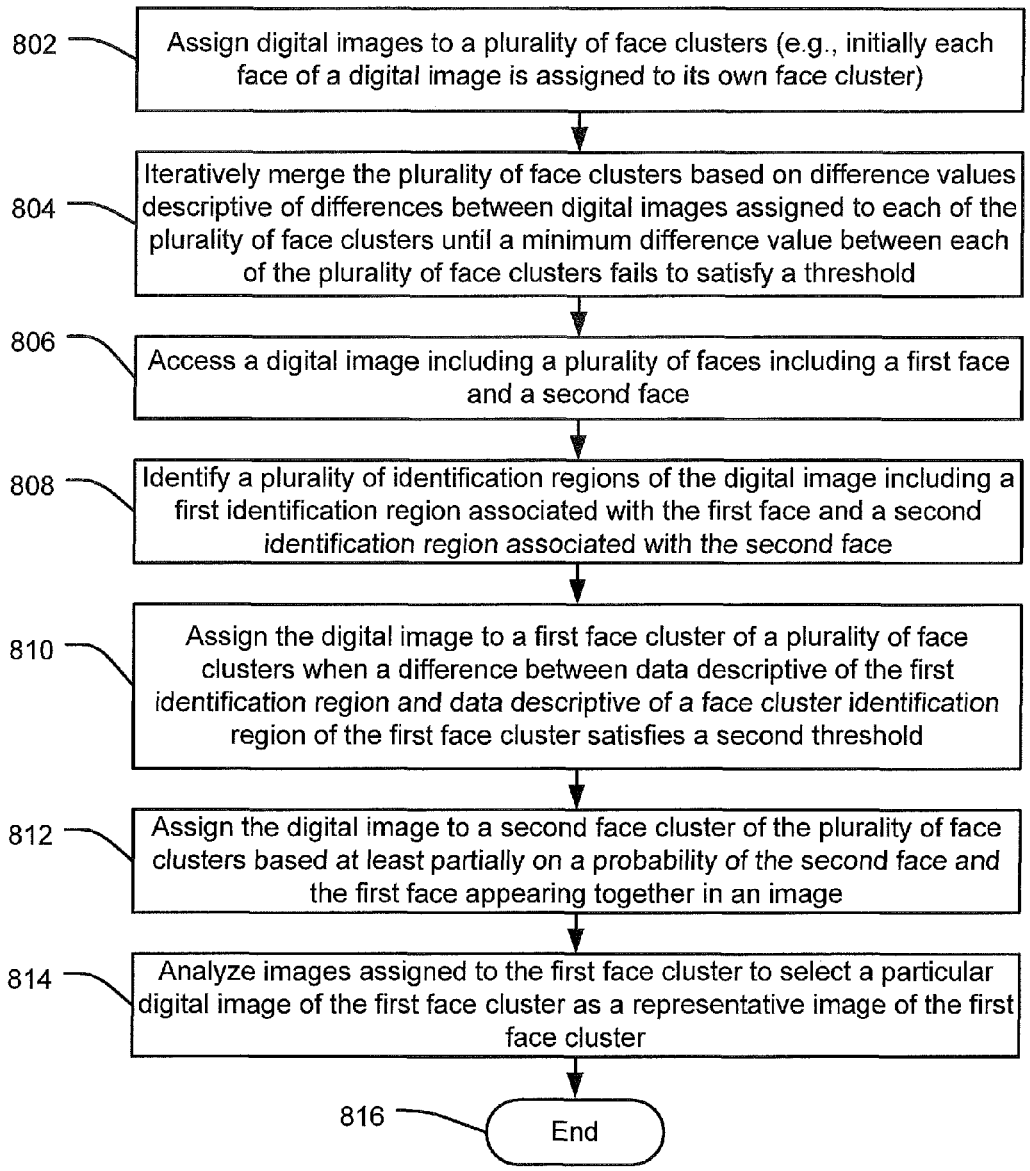
FIG. 8 is a flow diagram of a particular embodiment of a method to assign a digital image to a face cluster.

Referring to FIG. 8, a flow diagram of a particular embodiment of a method to assign a digital image to a face cluster is depicted. The method may be performed by a digital image analyzer, such as the digital image analyzer 102 of FIG. 1, the digital image analyzer 202 of FIG. 2, the digital image analyzer 302 of FIG. 3, the digital image analyzer 602 of FIG. 6 and the digital image analyzer 702 of FIG. 7.

The method begins by assigning digital images to face clusters. For example, initially, each digital image may be assigned to its own face cluster, at 802. Continuing to 804, the plurality of face clusters may be iteratively merged based on difference values descriptive of differences between digital images assigned to each of the plurality of face clusters until a minimum difference value between each of the plurality of face clusters fails to satisfy a threshold. For example, different portions of the digital image may be selected as identification regions and eigenface data may be determined for each of the identification regions. To illustrate, a first portion may include a face region, a second portion may include a head region, and a third portion may include a torso region. Difference values between the regions of different face clusters may be determined when merging clusters.

A digital image including a plurality of faces including a first face and a second face is accessed, at 806. Moving to 808, a plurality of identification regions of the digital image is identified, including a first identification region associated with the first face and a second identification region associated with the second face. Advancing to 810, the digital image is assigned to a first face cluster of a plurality of face clusters when a difference between data descriptive of the first identification region and data descriptive of a face cluster identification region of the first face cluster satisfies a second threshold. Proceeding to 812, the digital image is assigned to a second face cluster of the plurality of face clusters based at least partially on a probability of the second face and the first face appearing together in an image. Moving to 814, images assigned to the first face cluster may be analyzed to select a particular digital image of the first face cluster as a representative image of the first face cluster. The method ends at 816.

Thus, a digital image analyzer may assign digital images to face clusters and then iteratively merge the face clusters based on difference values between the digital images assigned to each cluster. When two faces are present in a digital image and one face has been identified while the other face has not been identified, the digital image analyzer may assign the digital image to a particular cluster based on a probability that the two faces appear together in an image. For example, when a face is turned in a different direction, the digital image analyzer may have difficulty assigning the image to the right cluster because changing the orientation of the face can change the eigenface values sufficiently that the face does not satisfy the threshold to be assigned to the cluster. Probability data may be used to assign the image to a cluster when two or more faces are in the image and one face has been identified but the other has not been identified. In a particular embodiment, video content may have been previously analyzed to identify a probability that two or more faces appear together. In another particular embodiment, the clusters may be analyzed to determine the probability of two people appearing in an image together. This probability may be used to select a subset of clusters to compare the second face to. The subset of clusters may be analyzed and the second face may be assigned to one of the subset of clusters when a second threshold (that is lower than the first threshold) is satisfied or may be assigned to the best fit cluster. In another embodiment, the eigenface values may be used to select a set of clusters that the second face may be assigned to and the probability may be used to select the cluster to assign the face to. To illustrate, when a first face appears in one hundred digital images and a second face appears along with the first face in seventy of those images, the digital image analyzer may determine that there is a seventy percent probability that the first face and the second face appear together in a particular shot. When the digital image analyzer encounters a digital image in which the digital image analyzer is able to identify the first face but is not able to identify another particular face appearing with the first face, the digital image analyzer may identify the particular face as the second face based on the seventy percent probability of the first face and the second face appearing together.

Figure 9:
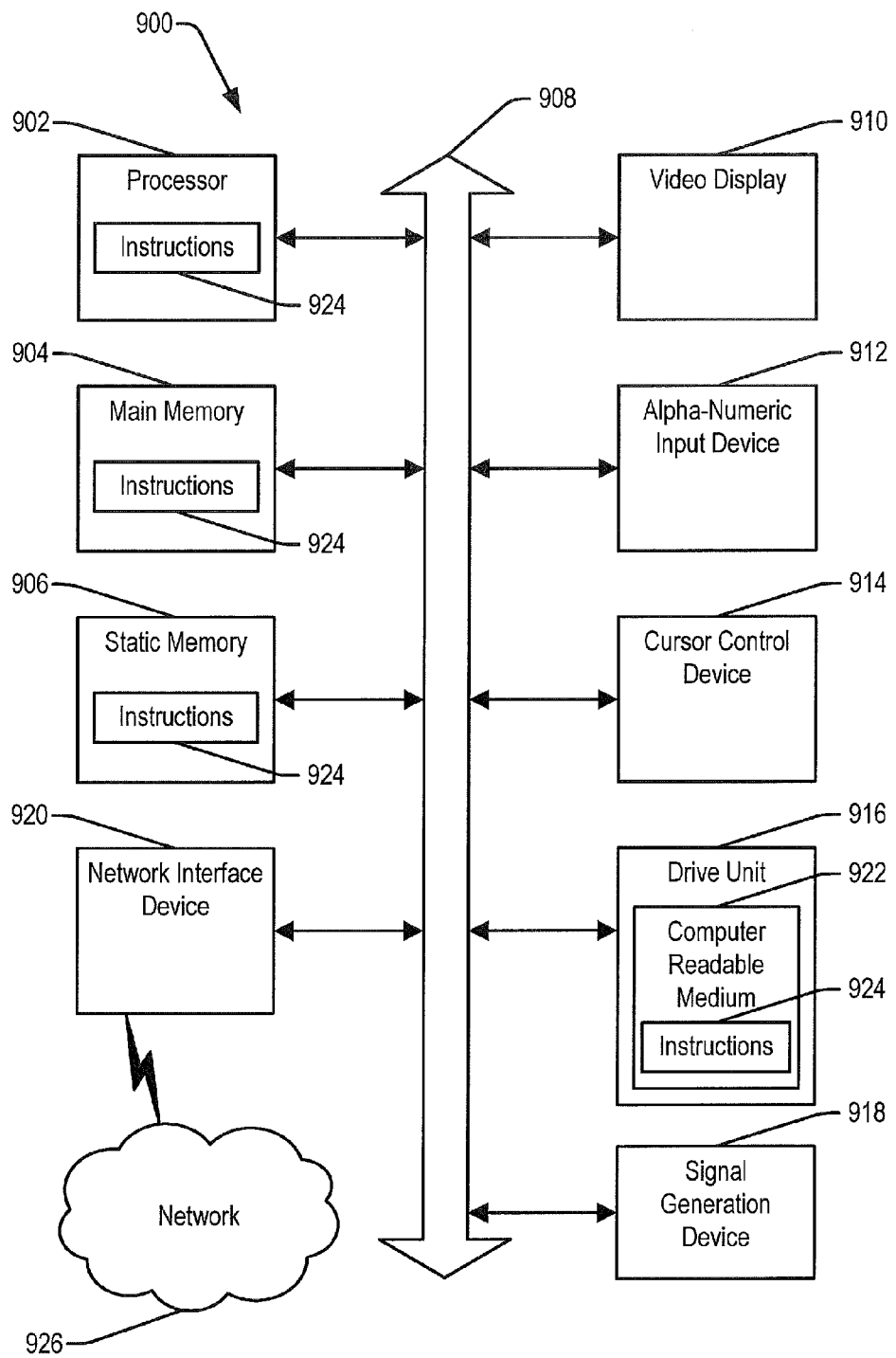
FIG. 9 is a block diagram of an illustrative embodiment of a general computer system.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900, or any portion thereof, may operate as a standalone device or may be connected, e.g., using a network, to other computer systems or peripheral devices.

In a networked deployment, the computer system 900 may operate in the capacity of a computing device, a digital image analyzer, and a digital image server, as described with reference to FIG. 1-3. The computer system 900 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics-processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, or a solid-state display. Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924, so that a device connected to a network 926 can communicate voice, video or data over the network 926. Further, the instructions 924 may be transmitted or received over the network 926 via the network interface device 920.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any tangible storage medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical, such as a disk or tapes or other storage device. Accordingly, the disclosure is considered to include any one or more of a computer-readable medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet and other network transmission and for video (e.g., TCP/IP, UDP/IP, HTML, HTTP, VoIP, IPTV, MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
    at a computer, accessing a digital image representing a plurality of faces including a first face and a second face, wherein the digital image is part of a frame of video data;
    at the computer, identifying a plurality of identification regions of the digital image including a first identification region associated with the first face and a second identification region associated with the second face;
    at the computer, assigning the digital image to a first face cluster of a plurality of face clusters when a difference between data descriptive of the first identification region and data descriptive of a face cluster identification region of the first face cluster satisfies a threshold; and
    at the computer, assigning the digital image to a second face cluster of the plurality of face clusters based on an analysis of a portion of the video data to determine a frequency at which the first face and the second face appear together.

2. The method of claim 1, wherein the video data comprises a sequence of shots and wherein the portion of the video data that is analyzed corresponds to a particular shot of the sequence of shots.

3. The method of claim 1, further comprising determining a probability of the second face and the first face appearing together in the digital image by;
    accessing a face cluster library that includes the first face cluster and the second face cluster;
    determining a number of images of the face cluster library that are assigned to both the first face cluster and the second face cluster in which the first face and the second face appear together; and
    determining the probability that the second face and the first face appear together in the digital image based on the number of images.

4. The method of claim 3, wherein the face cluster library includes images selected from two or more video data files.

5. The method of claim 1, further comprising, after assigning the digital image to the first face cluster, analyzing images assigned to the first face cluster to select a particular digital image of the first face cluster as a representative image of the first face cluster, the representative image having a difference value with respect to other digital images of the first face cluster that is smaller than difference values of each of the other digital images.

6. The method of claim 1, further comprising iteratively merging the plurality of face clusters based on difference values descriptive of differences between digital images assigned to each of the plurality of face clusters until a minimum difference value between each of the plurality of face clusters fails to satisfy a second threshold.

7. The method of claim 6, wherein each of the digital images is initially assigned to its own face cluster.

8. The method of claim 1, further comprising determining eigenface data for the first identification region, wherein the difference is based on the eigenface data.

9. The method of claim 1, wherein identifying the plurality of identification regions of the digital image includes:
    searching for faces in the digital image;
    when the first face is detected, selecting a first portion of the digital image based on characteristics of the first face as a first face region of the plurality of identification regions; and
    determining a data set descriptive of the first face region based on the first portion of the digital image.

10. The method of claim 9, further comprising selecting a second portion of the digital image that includes the first face, the second portion larger than the first portion, wherein the second portion comprises a head region of the plurality of identification regions.

11. The method of claim 10, wherein the first portion has a first center approximately aligned with a second center of the second portion, wherein the first portion has a first characteristic length based on the characteristics of the first face, and wherein the second portion has a second characteristic length that is a predetermined multiple of the first characteristic length.

12. The method of claim 11, wherein the first characteristic length is approximately a distance between eyebrows and mouth of the first face in the digital image.

13. The method of claim 9, further comprising selecting a third portion of the digital image that does not include the first face, wherein the third portion comprises a torso region of the plurality of identification regions.

14. The method of claim 13, wherein the first portion has a first characteristic length based on the characteristics of the first face, wherein the third portion has a third characteristic length that is a predetermined multiple of the first characteristic length, and wherein the third characteristic length specifies dimensions of the third portion and an offset of the third portion from the first portion.

15. A computer-readable storage device, comprising instructions that, when executed by a processor, cause the processor to perform operations comprising:
    accessing digital image including a plurality of faces including a first face and a second face, wherein the digital image is part of a frame of video data;
    identifying a plurality of identification regions of the digital image including a first identification region associated with the first face and a second identification region associated with the second face;
    assigning the digital images to a first face cluster of a plurality of face clusters when a difference between data descriptive of the first identification region and data descriptive of a face cluster identification region of the first face cluster satisfies a threshold; and
    assigning the digital image to a second face cluster of the plurality of face clusters based on an analysis of a portion of the video data to determine a frequency at which the first face and the second face appear together.

16. The computer-readable storage device of claim 15, wherein assigning the digital image to the first face cluster comprises:
    applying a weighting to data descriptive of identification regions associated with the first face to create weighted data descriptive of identification regions associated with the first face; and
    determining a first difference between the weighted data descriptive of the identification regions associated with the first face and the data descriptive of the face cluster identification region.

17. A system, comprising:
    a processor;
    a memory accessible to the processor, the memory including processor-executable instructions that, when executed by the processor, cause the processor to perform operations comprising:
        accessing a digital image including a plurality of faces including a first face and a second face, wherein the digital image is part of a frame of video data;
        identifying a plurality of identification regions of the digital image including a first identification region associated with the first face and a second identification region associated with the second face;
        assigning the digital images to a first face cluster of a plurality of face clusters based on a comparison between data descriptive of the first identification region and data descriptive of a face cluster identification region of the first face cluster; and
        assigning the digital image to a second face cluster of the plurality of face clusters based on an analysis of a portion of the video data to determine a frequency at which the first face and the second face appear together.

18. The system of claim 17, wherein a data record associated with the digital image includes information identifying a location of the digital image within the video data.

19. The system of claim 17, wherein the first face cluster and the second face cluster are accessed from a face cluster library.

20. The system of claim 19, wherein the face cluster library includes images from a plurality of video data files.

* * * * *